May 22, 1928.
T. W. STONE
1,671,093
GAS MAKING APPARATUS
Filed Aug. 5, 1921
6 Sheets-Sheet 4
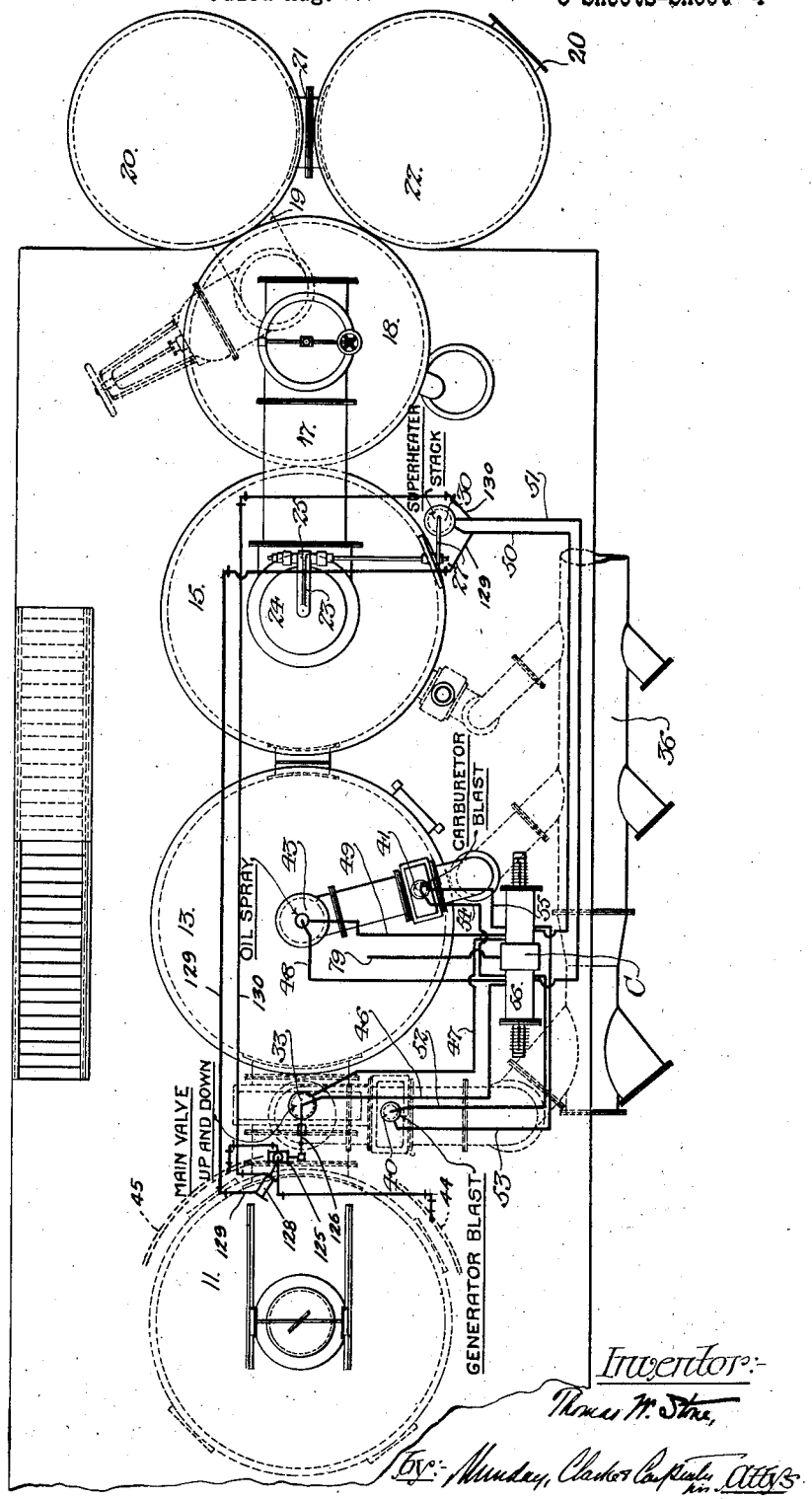

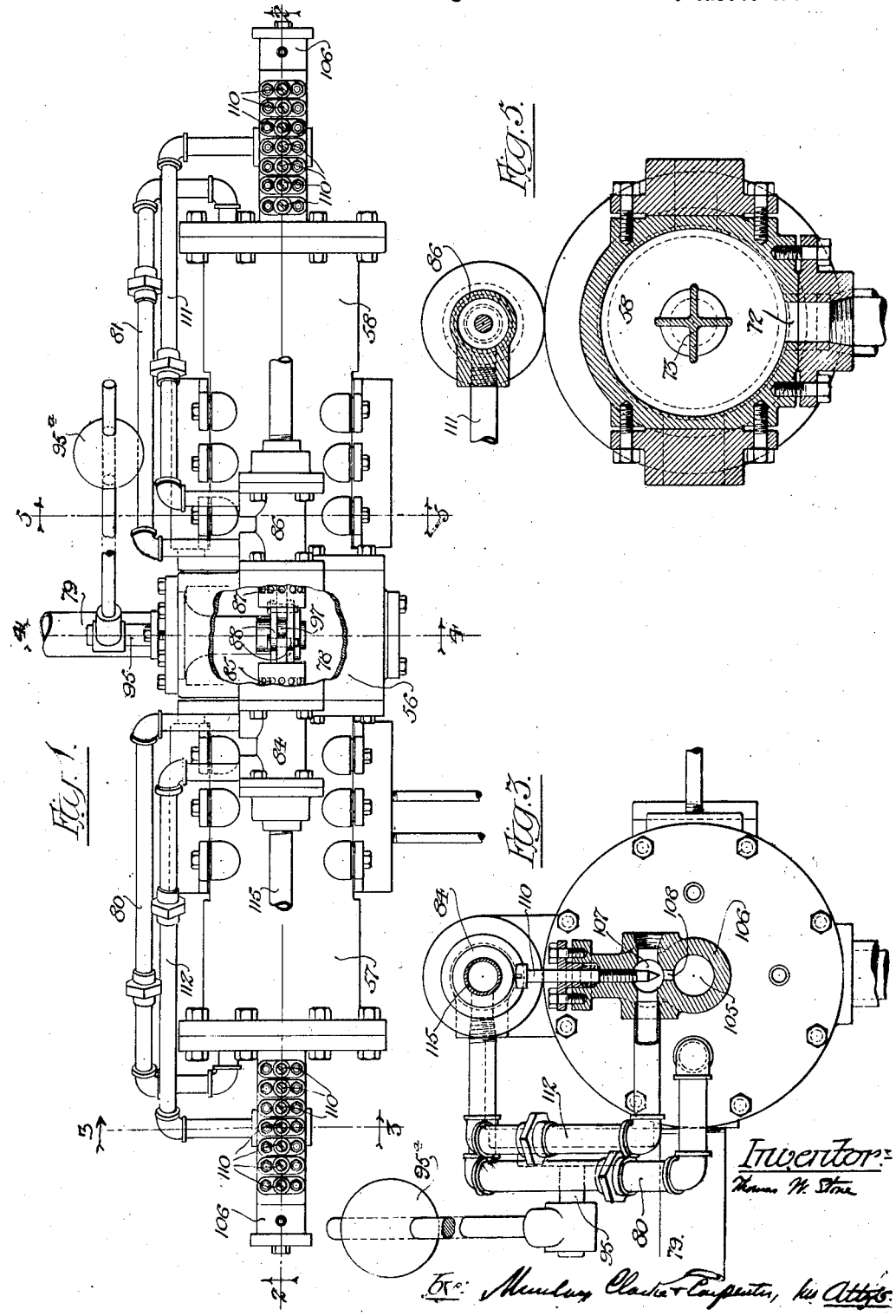

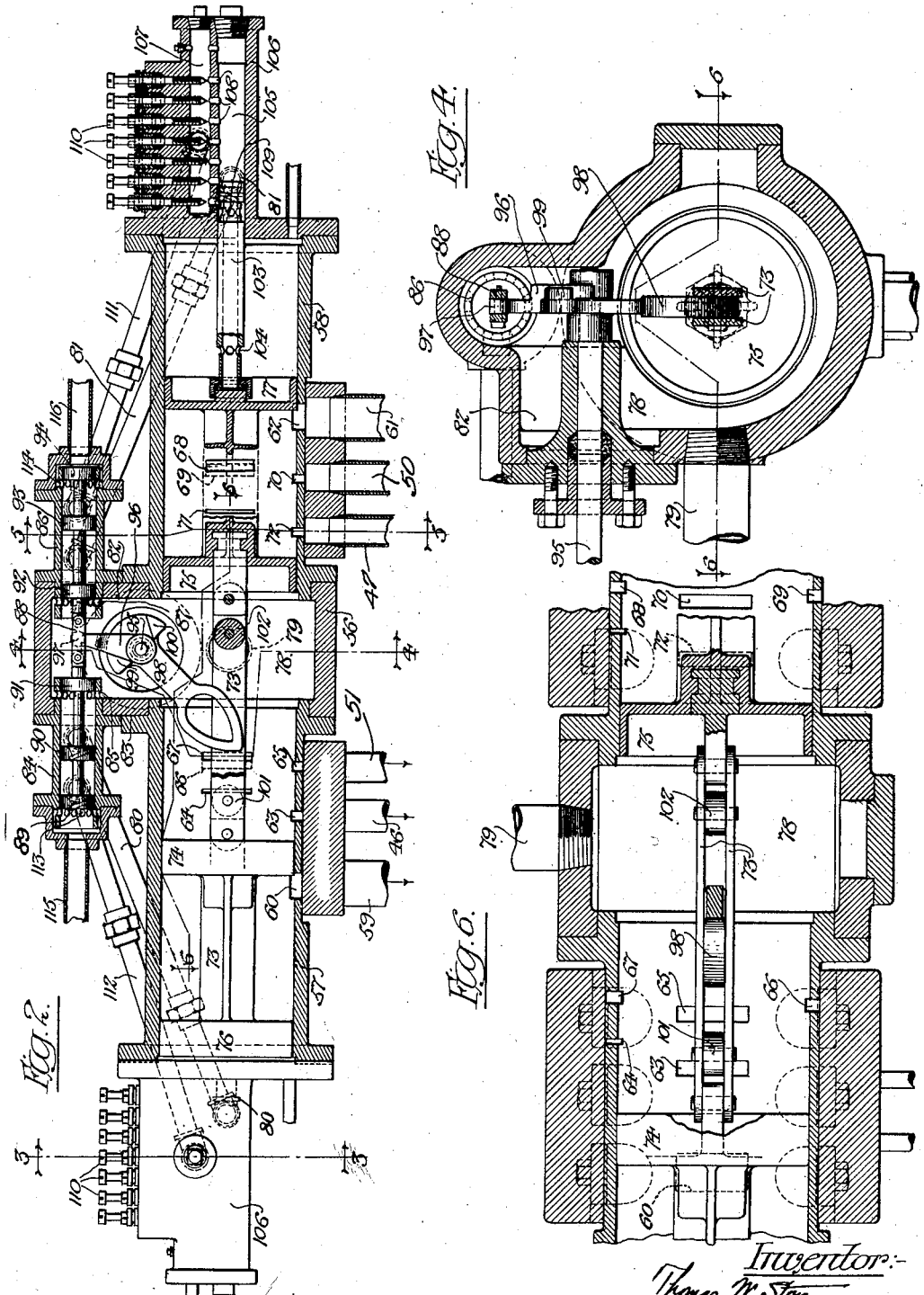

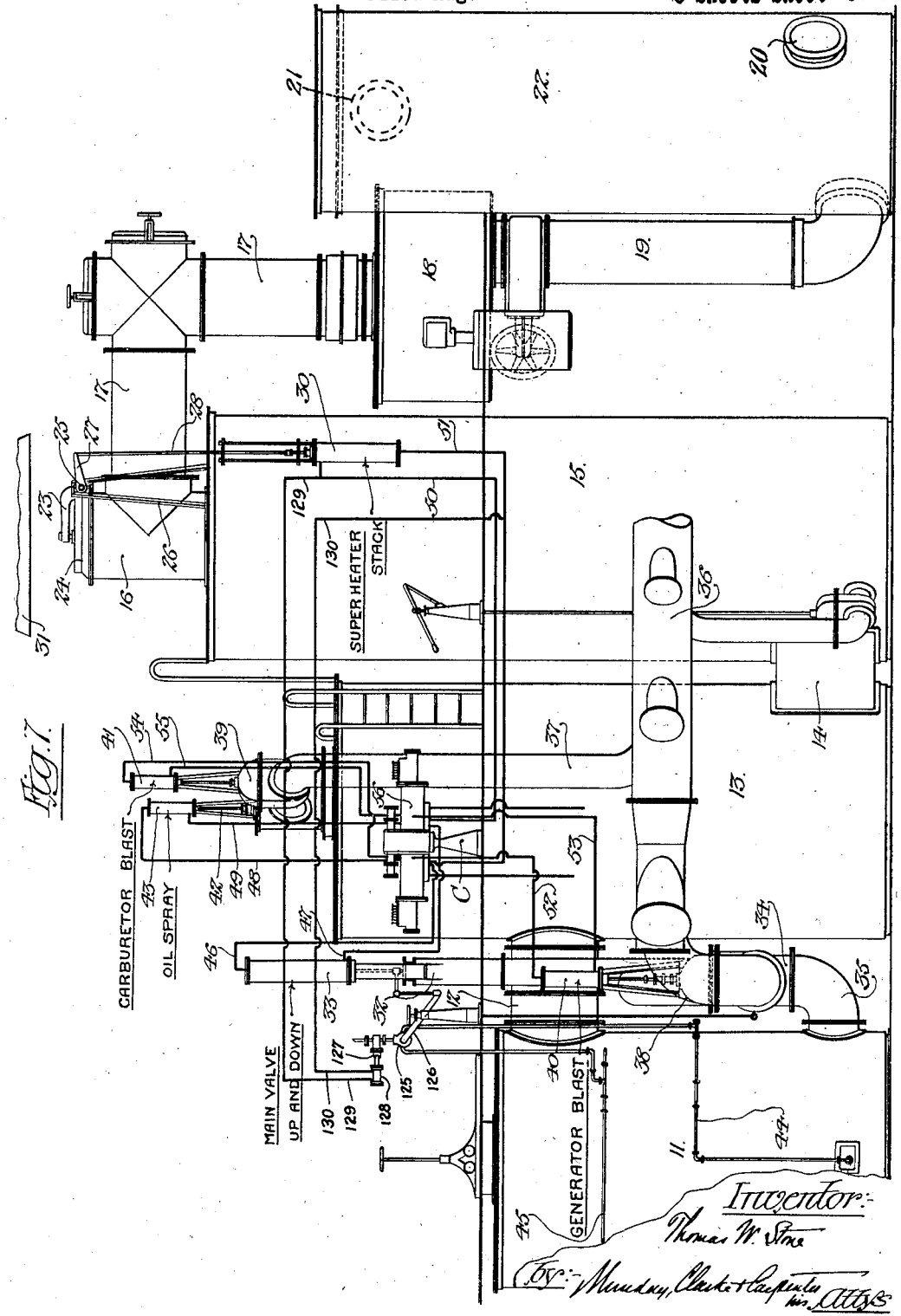

May 22, 1928.
T. W. STONE
1,671,093
GAS MAKING APPARATUS
Filed Aug. 5, 1921        6 Sheets-Sheet 5
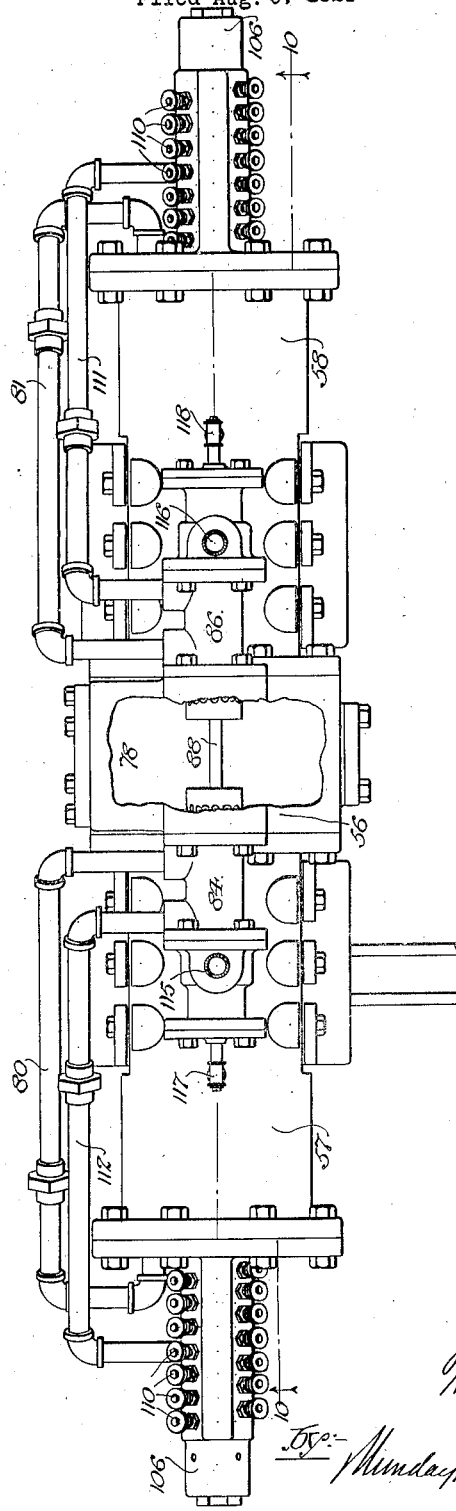

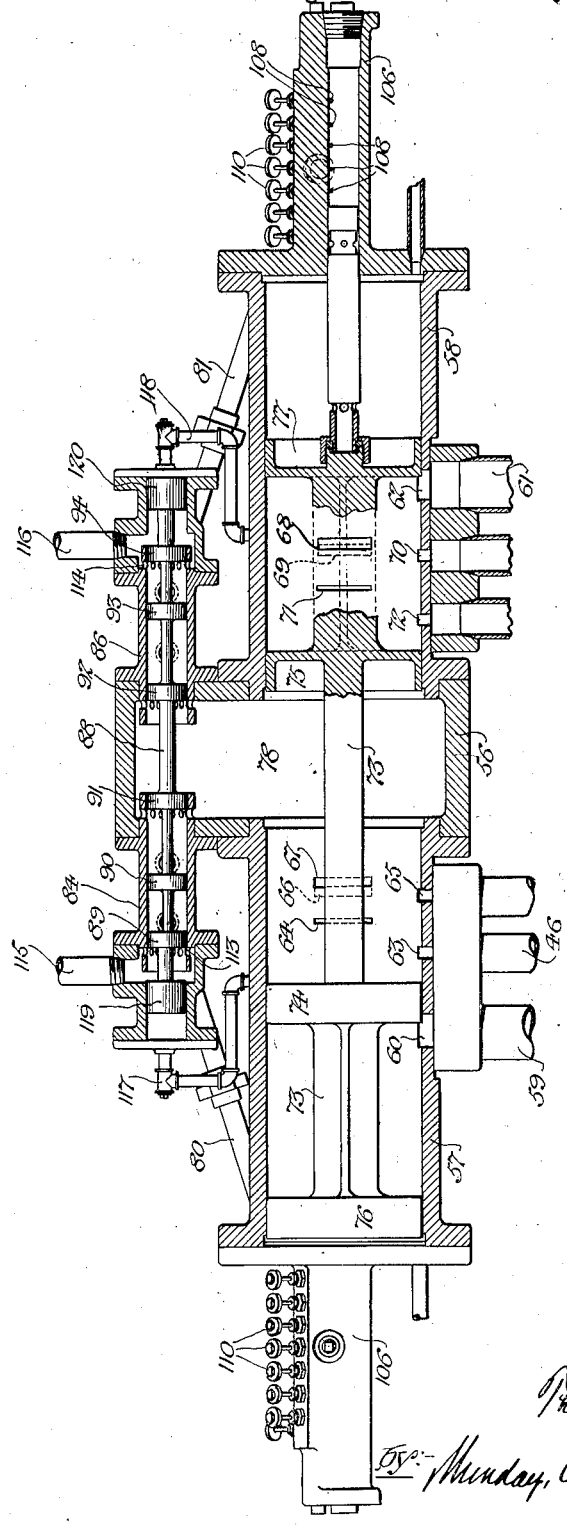

Patented May 22, 1928.

1,671,093

UNITED STATES PATENT OFFICE.

THOMAS W. STONE, OF FORT WAYNE, INDIANA, ASSIGNOR TO WESTERN GAS CONSTRUCTION COMPANY, OF FORT WAYNE, INDIANA, A CORPORATION OF INDIANA.

GAS-MAKING APPARATUS.

Application filed August 5, 1921. Serial No. 490,088.

This invention relates to gas making apparatus, such as water gas sets; the invention has for objects to provide an improved and efficient valve operating mechanism which will effect the operation of the several valves in the proper sequence required in the operation of such machines, and to provide for regulation of the valve operating mechanism in such manner that the time intervals between successive valve operations may be varied as desired, thereby permitting the duration of the several operating stages of the set to be changed individually at will, with the result that the machine may be quickly adjusted to conform to different operating conditions or to vary the product.

In addition to the general objects recited above, the invention has for other objects such improvements and advantages in construction and operation as are found to obtain in the structures and devices hereinafter described or claimed.

In the accompanying drawings forming a part of this specification and showing, for purposes of exemplification, preferred forms and manners in which the invention may be embodied and practiced, but without limiting the claimed invention to such illustrative instance or instances:

Figure 1 is a plan view of a valve operating mechanism constructed in accordance with the invention;

Fig. 2 is a vertical sectional elevation taken longitudinally of the main valve cylinder, as indicated by the line 2—2 of Fig. 1;

Fig. 3 is a transverse section taken on the line 3—3 of Fig. 1;

Fig. 4 is a transverse section taken on the line 4—4 of Fig. 1;

Fig. 5 is a transverse section taken on the line 5—5 of Fig. 1;

Fig. 6 is a detailed horizontal longitudinal section taken on the line 6—6 of Fig. 4;

Fig. 7 is an elevational view of a water gas set equipped with a valve operating mechanism such as illustrated in the preceding figures.

Fig. 8 is a plan view of the apparatus illustrated in Fig. 7.

Fig. 9 is a plan view of the modified form of valve operating mechanism; and

Fig. 10 is a longitudinal sectional elevation of the mechanism shown in Fig. 9, the view being taken on the line 10—10 of Fig. 9, In the illustrated embodiment of the invention the valve operating mechanism is applied to a water gas set. For convenience the present description will be confined to this use of the invention. Features of the improved valve operating mechanism are, however, capable of other valuable applications; consequently the scope of the invention is not confined to the specific use and specific embodiment herein described as an illustrative example.

Referring to the drawings, and more particularly to Figs. 7 and 8, there is shown a carburetted water gas set, said apparatus embodying in its construction the following essential elements:

The water gas generator 11 provided with the usual chamber for carbonaceous fuel is connected by means of the discharge pipe section 12 with a carburetor 13. The latter in turn is connected at its bottom by the discharge passageway 14 with a superheater 15. The carburetor and superheater are of the well known constructions embodying essentially two chambers filled with checkerbrick for storing up heat while the air blast is on, the heat so stored in the checkerbrick being employed in the gas carburetion and fixing in the subsequent steam run. At the top of the superheater 15, there is provided a discharge pipe 16 having a branch 17 the latter leading to a water seal 18. The water seal 18 is in turn connected by means of a discharge pipe 19 with a scrubber 20, see Fig. 8; said scrubber 20 is connected by a pipe section 21 with the condenser 22 from which the gas passes through outlet 20 to be further treated, stored, or used.

The top of the discharge pipe 16 leading from the superheater may be opened and closed by the stack valve 23. Said stack valve 23 consists essentially of a cover plate 24 adapted to fit over the top of the discharge pipe 16 pivotally connected at 25 in a suitable upright 26. Connected with the cover plate 24 at its pivotal point is an operating link 27 the opposite end of which is pivoted to the upper end of a pressure-operated piston 28. The piston 28 is provided with the usual head, not shown, which works in a cylinder 30 and responds to pressure supplied to the upper end of the cylinder 30 to open the stack valve and conversely to pressure applied to the lower end of the cylinder to close such stack valve. Above the discharge pipe 16, is positioned a stack 31 through which the gases and products of combustion from the superheater pass when the stack valve 23 is open.

The generator 11 is constructed so as to be capable of up and down steam runs, that is to say:—when on the up run, the steam passes from the bottom of the generator through the mass of glowing fuel and the water gas generated as the result of the chemical reaction between the steam and the glowing fuel discharges from the top; whereas, on the down run, the steam enters at the top of the generator and the resultant gas discharges from the bottom. This change in direction in flow of the gas in the generator is effected by means of the main or up-and-down run valve 32. Said valve embodies in its construction pressure cylinder 33 within which works the usual piston, not shown. The valve piston, it will be understood, controls a port in the pipe section 12 and a second port in connection with the vertical pipe 34, the latter being connected by means of a short pipe union 35 to the lower end of the generator chamber. When the piston in the cylinder 33 is in the down position, the pipe section 12 is open to permit passage of the gases from the upper end of the generator into the carburetor. Concurrently, the vertical pipe 34 is shut off from the generator to prevent passage of gas from the lower end of the generator. On reverse operation of the piston in the cylinder 33, the pipe section 12 is shut off from direct communication with the generator and placed in communication therewith by way of the vertical pipe 34, whereupon the gaseous products from the generator pass out its lower end into the carburetor 13. The above mentioned change of direction of the steam from up-flow to down-flow is coincident with the shift of the above mentioned main or up-and-down run valve 32, because the steam-cock 125 between the up and down run steam lines 44 and 45 is, as usually, connected (by arms 126) with said main valve operating mechanism, so that as said up-and-down run valve 32 is shifted it correspondingly turns said steam-cock 125 to shift the steam flow into the up-run steam-line 44 or the down-run steam-line 45; and the on-and-off steam-cock 127 in the steam-supply line is, as usually, operated by a cylinder 128 connected by fluid lines 129 and 130 with the stack valve operating mechanism lines 50 and 51, so that such steam-cock closes when the stack valve opens, and opens when the stack valve closes, the steam supply being thus cut off from both the up-run and down-run steam lines to the generator when the stack valve is open.

Extending horizontally of the set is a blast pipe 36 which leads to the vertical pipe 34 and is connected therewith at a point located just above the short pipe union 35, but below the up-and-down run valve connection in said vertical pipe 34. Also connected with the main blast pipe 36 is a branch 37 leading to the carburetor 13. Separate valves are provided for controlling the air blast supplied by the pipe 36 to the generator and the carburetor, namely, the generator blast valve 38 and a carburetor blast valve 39. Both of these valves are preferably of the gate type respectively provided with cylinders 40 and 41, having pistons which in the up position operate to open the valves and in the down position operate to close the valves. For supplying oil to the carburetor during a steam run, there is provided an oil spray valve 42 operated by a similar piston which works in a cylinder 43. When the piston is in the up position in the cylinder 43 the supply of oil to the carburetor is cut off and conversely, on reverse operation of the piston the supply of oil is admitted to the carburetor.

In a carburetted water gas set, such as above briefly described, the cycle of operation is as follows: The up and down run valve 32 is operated to the up-run position; the oil valve 42 is operated to cut off the supply of oil to the carburetor; the stack valve 23 is opened to permit the gases from the superheater to pass into the stack; the generator blast valve 38 is opened to permit the air to pass into the bottom of the generator; the carburetor blast valve 39 is opened to permit a further supply of air to the carburetor. The operation of the valves in the above stated sequence is known as "taking off the run and putting on the blast." During the blast cycle of operation the hot products of combustion from the generator pass out of the top of the generator into the carburetor, where any unconsumed, or partially consumed portion of the gas is burned in the secondary air supplied by the carburetor blast. The whole volume of the hot products of combustion passes through the checkerbrick in the carburetor and through the superheater to the stack, thereby storing up in the carburetor and superheater a great amount of heat for the subsequent run. As soon as the blast cycle of operation is complete, the next operation of the cycle is carried out, this being generally known as "taking off the blast and putting on the run." The carburetor blast valve is closed; the generator blast valve is closed; the stack valve is closed; the oil spray valve is turned on; as the main valve is already in the up-run position, steam is admitted under the incandescent fuel in the generator through the steam pipe 44 so that the gas passes out of the top of the generator into the carburetor where it is enriched by oil which freely volatilizes and intermixes with the blue water gas from the generator, while the mixture passes through the heated checkerbrick in the carburetor chamber and superheater chamber. Finally the gas discharges through the outlet 16 and the branch 17 of the water seal 18 from which it passes to the scrubber 20 and the condenser 22. On completion of the up-run, the down-run is commenced by next operating the main valve 32 to the down-run position, whereupon steam is admitted to the upper end of the generator through the steam pipe 45, with the result that the blue water gas passes out of the lower end of the generator into the vertical pipe 34 and subsequently into the upper end of the carburetor chamber. At the end of the down-run, the main valve is again operated to the up-run position for another up-run. But at the termination of the second up-run of this cycle, the oil valve is closed and the shift of "taking off the run and putting on the blast" is again made. Whereupon the several valves are operated in the blasting sequence hereinabove set forth.

In the operation of a water gas set, according to the above cycle, it is important that the valves be operated substantially in the sequence described above, that is to say—when taking off the run and putting on the blast the up-and-down run or main valve must be first operated to the up-run position, the oil valve must next be closed, the stack valve must next be opened and followed in sequence by opening of the generator blast valve and carburetor blast valve. It is important that the stack valve be in the open position substantially concurrently with the opening of the generator blast and that, in turn, the generator blast valve be in the open position before the carburetor blast valve is opened. Conversely, when taking off the blast and putting on the run, it is important that the carburetor and generator blast valves be closed before the stack valve is closed. These considerations are absolutely essential to the safe manipulation of the set for the obvious reason that if any of the blast valves be opened to any appreciable extent while the stack valve is closed, the blast will be blown back into the scrubber and condenser where it will mix with the gas and form an explosive mixture.

According to the invention, there is provided an improved valve operating mechanism which effects automatic operation of the valves in proper sequence during both the blast cycle and the run cycle. The valve operating mechanism of the invention entirely dispenses with the necessity for manual operation of the several valves, although it may be employed, in a water gas set, in conjunction with a manually controlled valve operating mechanism, such as described in my prior Patent No. 1,353,977, granted September 28, 1920, by employing the simple expedient of connecting the various fluid pressure lines hereinafter described in parallel to both the manually controlled apparatus and the automatic valve operating mechanism, so that the operation of the one will be entirely independent of the operation of the other. And, by a simple shift, the valves may be either operated manually or operated automatically by the improved mechanism of the present invention. When the generator is shut down, the fluid pressure to the automatic control is of course also shut off; and in starting up again, or whenever the fluid pressure to the automatic control is shut off, the manual positioning of any of the main apparatus valves causes a fluid-pressure reaction back into the automatic control and properly positions the automatic control to continue the proper sequence of operations as soon as the operating fluid pressure is restored to the automatic control.

Still referring to Figs. 7 and 8, the main up-and-down run valve 32 is controlled in its operation by fluid pressure lines 46 and 47, the line 46 leading to the top of the cylinder 33 and the line 47 leading to the bottom of said cylinder. The oil valve 42 is controlled in its operation by fluid pressure lines 48 and 49, the line 48 leading to the top of the cylinder 43 and the line 49 leading to the bottom of said cylinder. The stack valve 23 is controlled in its operation by fluid pressure lines 50 and 51 the line 50 leading to the top of the cylinder 30 and the line 51 leading to the bottom of said cylinder. The on-and-off steam-cock or valve 127, is controlled by the same stack valve mechanism pressure lines 50 and 51, through the lines 129 and 130 leading to the cylinder 128 that shifts said valve 127; and the adjacent reversing steam-cock 125, between the up-run steam-line 44 and the down-run steam-line 45, is connected, by arms 126, as before mentioned, with the main up-and-down run valve 32 and is correspondingly shifted thereby in the usual well-known manner. The generator blast valve 38 is controlled in its operation by fluid pressure lines 52 and 53, the line 52 leading to the top of the cylinder 40 and the line 53 to the bottom of said cylinder. The carburetor blast valve 39 is controlled in its operation by fluid pressure lines 54 and 55, the line 54 leading to the top of the cylinder 41 and the line 55 to the bottom of said cylinder.

Referring now more particularly to the form of the invention illustrated in Figs. 1 to 6 inclusive, there is provided at a suitable control station, indicated at C in Figs. 7 and 8, a cylinder 56, to which the several fluid pressure lines hereinabove set forth lead; the cylinder 56 functions as a central power station from which fluid pressure, such as oil, is released through the several fluid-pressure line connections from a source of fluid pressure supply, to operate the several valves in proper sequence during each cycle of operation of the gas making machine. As shown in Figs. 1 and 2, the cylinder 56 comprises a left-hand section 57 and a right-hand section 58. A discharge pipe 59 communicates by a port 60 with the left-hand section 57 of the cylinder 56, and a similar discharge pipe 61 communicates by a port 62 with the right-hand section 58 of said cylinder. The discharge pipes 59 and 61 are respectively located at the extreme left and right of the pressure line connections leading to said left and right hand sections of the cylinder. The fluid pressure line 46 to the top of the cylinder 33 of the main up-and-down run valve 32 leads from the left hand section 57 of the cylinder 56, with which it is communicably connected by means of a port 63, said port 63 being the next succeeding port to the right of the port 60. The fluid pressure line 48 to the top of the oil spray valve cylinder 43 (see Fig. 7) also leads from said left hand section 57 with which it is communicably connected by a port 64 (see Fig. 2) said port being the next succeeding port to the right of the port 63. The fluid pressure line 51 to the bottom of the cylinder 30 of the stack valve also leads from the left hand section 57, with which it is communicably connected by a port 65, the latter being the next succeeding port to the right of the port 64. The fluid pressure line 52 to the top of the generator blast cylinder 40 (see Fig. 7) also leads from the left hand section 57, being communicably connected therewith by a port 66, (see Fig. 2) which is the next succeeding port to the right of the port 65 (see Fig. 6). The fluid pressure line 54 leading to the top of the carburetor blast cylinder 41 is communicably connected with the left hand section 57 by a port 67, the latter being the next succeeding port to the right of the port 66. The fluid pressure line 55 (see Fig. 7) to the bottom of the carburetor blast cylinder 41 leads from the right hand section 58 of the cylinder 56, with which it is communicably connected by means of a port 68, the latter being the next succeeding port to the left of the port 62 of the discharge line 61. The fluid pressure line 53 to the bottom of the generator blast 40 leads from the right hand section 58 with which it is communicably connected by a port 69, the latter being the next succeeding port to the left of the port 68. The fluid pressure line 50 to the top of the stack valve cylinder 30 leads from said right hand section 58 being communicably connected therewith by a port 70, the latter being the next succeeding port to the left of the port 69. The fluid pressure line 49 to the bottom of the oil spray valve cylinder 43 leads from said right hand section 58 being connected therewith by a port 71, the latter being the next succeeding port to the left of the port 70. The fluid pressure line 47 to the bottom of the main up-and-down run valve cylinder 33 also leads from the said right hand section 58 and is communicably connected therewith by a port 72, the latter being the next succeeding port to the left of the port 71.

Within the cylinder 56 is a piston rod 73 provided with two spaced inner piston heads 74 and 75 and with two outer piston heads 76 and 77. The outer piston heads 76 and 77 respectively work in the left hand and right hand sections 57 and 58 of the cylinder 56 and respectively receive on their outer faces fluid pressure supplied to the left and right hand ends of said cylinder, for operating the piston assembly to the right or to the left in said cylinder. The inner piston head 74 works in the left hand section 57 of the cylinder and controls the flow of fluid pressure in succession through the valve ports 63, 64, 65, 66 and 67; whereas the other inner piston head 75 works in the right hand section 58 and controls in succession the flow through the ports 68, 69, 70, 71 and 72.

The space between the inner faces of the two valve-controlling piston heads 74 and 75 functions as a floating chamber 78 in which is maintained a supply of fluid-pressure for delivery to the fluid pressure lines of the several valves controlled by the reciprocation of the piston assembly. Fluid pressure, such as oil under pressure, is fed to said supply chamber 78 through the high-pressure fluid supply line 79 which leads to the chamber 78. The fluid may be kept at the required pressure by means of a suitable pump. While it is not absolutely essential to employ oil as the motive power, the use of oil is preferable on account of its lubricating effect on the parts of the valve operating mechanism, with the result that little if any wear will take place in the operation of the device.

Fluid pressure supply by the pipe 79 to the chamber 78 is utilized for the purpose of moving the piston 73 in the cylinder 56 and fluid pressure from this source is alternately directed to the portion of the cylinder 57 to the left of the piston head 76 by means of a fluid pressure supply pipe 80 and to the portion of the cylinder 58 to the right of the piston head 77 by means of a fluid pressure supply pipe 81. The control of the flow of the motive fluid alternately to the supply pipes 80 and 81 is effected by means of a controlling valve mechanism mounted, as shown, on top of the main cylinder 56 and adapted to be reversed by the travel of the piston 73 over to its extreme left hand or right hand position in the cylinder. As shown in Fig. 2 and in Fig. 4, the floating chamber 78 communicates in all positions of the piston 73 with a supply chamber 82 formed by an extension 83 of the cylinder structure. This fluid pressure supply chamber 82 communicates with a left hand controlling valve cylinder 84 having a series of ports 85 which open up into the chamber 82, and also communicates with a right hand controlling valve cylinder 86 having a series of ports 87 which similarly open up into the aforesaid chamber 82. The fluid pressure supply pipe 80 to the left hand section 57 of the cylinder 56 is connected with the left hand controlling valve cylinder 84 and the fluid pressure supply pipe 81 to the right hand section 58 of the cylinder 56 is connected to the right hand controlling valve cylinder 86. Working within the two controlling cylinders 84 and 86 is a valve piston 88 having at its left hand end spaced valve heads 89, 90 and 91 which control the flow through the valve cylinder 84 and at its right hand end spaced valve heads 92, 93 and 94 which control the flow through the valve cylinder 86.

Journaled within the chamber 82 is a short shaft 95 on which is mounted the valve operating arm 96, the latter having an operative connection at 97 with the valve piston 88. The shaft 95 is operated by a counterweighted arm 95ª (Fig. 1). A swinging arm 98 is journaled on the shaft 95, and this arm is provided with a pair of oppositely disposed lugs 99 and 100 which are respectively adapted to engage and swing the arm 96 to throw the arm 95ª past dead-center during the movement of the arm 98 into either its extreme left hand or its extreme right hand position. The arm 98 extends below the shaft 95, as shown in Fig. 2, and its lower end is engageable with either one of a pair of operating rollers 101 and 102 carried by the main piston 73 of the valve operating mechanism. During the right to left movement of the piston 73 the roller 102 engages the arm 98, toward the end of the stroke of the piston, and swings said arm 98 toward the left, which action is transmitted through the lug 99 to the arm 96 to cause the counterweighted arm 95ª to further swing the arm 96 and move the valve piston 88 into position for uncovering the ports 85 of the left hand valve cylinder 84 and for simultaneously shutting off communication between the ports 87 of the right hand cylinder and the interior of that cylinder. On reverse travel of the piston 73, that is, from left to right the roller 101 engages the lower end of the arm 98 which, through the same connections, effects operation of the valve piston 88 to establish communication between the right hand valve cylinder 86 and the fluid pressure supply chamber 82 and simultaneously to cut off communication from the left hand valve cylinder 84 and the pressure supply chamber 82.

When the parts are in the position permitting fluid pressure to flow through the ports 85 of the left hand cylinder, as shown in Fig. 2, the supply of fluid pressure from the chamber 82 passes through the supply pipe 80 to the left hand section 57 of the main cylinder 56 to the left of the piston head 76 and the pressure fluid presses on head 76 and causes the piston 73 to travel from left to right in said main cylinder. Such movement of the piston 73 is, of course, accompanied by a like movement of the piston heads 74 and 75 in the same direction. As the inner piston head 74 travels toward the right, the several ports 63, 64, 65, 66 and 67 of the left hand cylinder section 57 are successively, in the order above named, cut off from communication with the high pressure chamber 78 and placed in communication with the port 60 of the exhaust pipe 59. Concurrently with the the above set forth operation, the concurrent travel of the other inner piston head 75 to the right cuts off the ports 72, 71, 70, 69 and 68, successively in the order named, from communication with the port 62 of the exhaust pipe 61 and places such ports in communication with the high pressure chamber 78. The movement of the piston 73 from left to right thus operates to reverse the supply of motive power (fluid pressure, such as oil under pressure) successively to each of the valve cylinders 33, 43, 30, 40 and 41 in the order named. When the piston 73 nears the end of its left-to-right movement the roller 101 engages and moves, as hereinbefore described, the arm 98 to shift it and the arm 96 and the shaft 95 and the counterweight 95ª, which shifts the position of the piston 188 so that supply of pressure fluid to conduit 80 through ports 85 is cut off and concurrently supply of pressure fluid to conduit 81 through ports 87 is effected, such reversal in flow causing the fluid to press on the head 77, instead of on the head 76, which moves the piston 73 in the other direction, to the left, and while so moving the oil in the chamber to the left of head 76 is being exhausted through needle valves 110 to the conduit 112, the rate of outflow of pressure fluid through the needle valves 110 determining the rate of movement of the piston 73 as hereinafter described. On movement of the piston 73 from its extreme right hand to its extreme left hand position the reverse action takes place, that is to say, the supply of fluid pressure is reversed to the cylinders 41, 40, 30, 43 and 33 of the apparatus valves. In accordance with the present arrangement, the operation of moving the piston 73 from its left hand to its right hand position first throws the main valve to the up-run position (which, as before mentioned, also opens the up-run steam line 44), next shuts off the supply of oil through the oil spray valve, next opens up the stack valve (and, as before mentioned, shuts off the steam supply to the generator), next turns on the air blast through the generator blast valve and then turns on the air blast through the carburetor blast valve. Conversely, the motion of the piston 73 from right to left in the cylinder 56 first shuts off the carburetor blast valve, then shuts off the generator blast valve, then shuts off the stack valve (and, as before mentioned, opens the main steam supply to the generator), then turns on the supply of oil through the oil spray valve, and then operates the main valve to the down-run position (which, as before mentioned, also opens the down-run steam line 45). Consequently, the simple operations of moving the piston 73 first to the right and then to the left in the cylinder 56 completes an entire cycle of "run" and "blast" in a water gas machine. No manual valve operation whatever is required, the opening or closing of the several valves in their proper order for safe and efficient water gas production being effected automatically by the reverse of fluid pressure to the supply connections effected by the simple movement of the piston 73.

The distance between adjacent pairs of pressure-line ports in the left and right hand cylinder sections 57 and 58 initially determines the interval between the operations of any successively operated valves. Provision however, is made for effecting wide adjustments of the several intervening intervals between valve operations by adjustably varying the rate of movement of the piston heads 74 and 75 between any pair of adjacent ports independently of the rate of movement of said piston heads between any other pairs of adjacent ports. The outer piston heads 76 and 77 are respectively provided with hollow stems 103 (as shown at the right of piston head 77 in Figs. 2 and 10), these stems respectively communicating with the interiors of the right and left hand cylinder sections 58 and 57 by means of ports 104 (as shown at the right of piston head 77 in Figs. 2 and 10). The stem 103 of each piston head 76 and 77 projects into a longitudinal chamber 105 formed in an extension 106 of the cylinder section 58 or 57. The longitudinal chamber 105 of each cylinder extension 106 is communicably connected with an exhaust chamber 107 by means of a series of exhaust ports 108, there being, in the embodiment of the invention illustrated in Figs. 1 to 8 inclusive seven of such ports 108. The outer end of each hollow stem 103 is provided with a series of exhaust ports 109, and, as the movement of the piston head to which the stem 103 is connected causes the latter to move along in the chamber 105 the ports 109 are successively brought into registry with the ports 108. The travel of the piston head 76 or 77 toward the outer end of its cylinder section causes the exhaust pressure fluid in its cylinder section to pass into the hollow stem 103 and be successively exhausted through the exhaust ports 108 as the ports 109 of the hollow stem move into registry with said ports 108. Adjustably mounted in each cylinder extension 106 is a series of needle valves 110, the latter respectively co-operating with the ports 108. Each needle valve provides an individual adjustment of the area of its respective port. With this construction, the rate of discharge of the exhaust in the different stages of travel of the piston 73 may be controlled and consequently the rate of movement of the piston in each stage, that is, between any two valve operations may be varied independently of the rate of movement between other stages, with the result that small adjustments of the needle valves 110 are effective to vary the times between the operations of the several apparatus valves.

The exhaust pressure fluid from the right hand cylinder section 106 passes through an exhaust line 111 connected with the chamber 107 to the valve cylinder 86 and the exhaust pressure fluid from the corresponding chamber of the left hand extension 106 passes through an exhaust line 112 to the valve chamber 84. The valve chambers 84 and 86 are respectively provided with a series of ports 113 and 114, which series are respectively adapted to be placed in communication with fluid exhaust lines 115 and 116. The flow through the exhaust ports 113 and 114 is controlled by the heads 89 and 94 of the valve piston 88 and the flow of the exhaust fluid into the fluid pressure supply chamber 82 is prevented in all positions of the valve piston 88 by the valve heads 90 and 93. When the valve head 91 of the chamber 84 is in position to open the ports 85 the valve head 94 of the chamber 86 is in position to open the ports 114, thereby permitting the exhaust fluid from the right-hand section 58 of the cylinder to flow into the pipe 116. On reverse of the valve, the left hand section 57 of the cylinder is connected with the exhaust fluid pipe 115 and the right hand section 58 of the cylinder is connected through the supply pipe 81 with the pressure fluid supply chamber 82.

In the form of the invention illustrated in Figs. 9 and 10, the fluid pressure, such as oil under pressure, supplied by the chamber 78 is utilized for the purpose of throwing the controlling piston 88. For this purpose, the left hand section 57 of the main cylinder is connected by a fluid pressure supply pipe 117 with the left hand valve cylinder 84; similarly the right hand section 58 of the main cylinder is connected by a fluid pressure supply pipe 118 leading to the right hand valve cylinder 86. At its extreme left and right ends the valve piston 88 is provided with piston heads 119 and 120. With this construction, as the main piston rod 73 approaches the end of its right to left stroke the port of the pipe 117 is uncovered permitting fluid pressure to flow against the head 119 to reverse the controlling valve. The valve is reversed to its other position when the piston head 75 uncovers the port of the supply pipe 118 to permit the fluid pressure to flow against the valve head 120. The modified form of the invention also shows two series of adjusting needle valves 110 for each cylinder extension 106. As shown in Fig. 9, the needle valves of one series of each cylinder extension are staggered with respect to the needle valves of the other series. The needle valves of both series control ports 108 as hereinabove described, the double series of needle valves providing an exceedingly flexible adjustment of the movement of the main piston 73 toward its several operating stages. In all other respects the apparatus illustrated in Figs. 9 and 10 is the same as that hereinabove described.

The invention as hereinabove set forth is embodied in a particular form of construction but may be variously embodied within the scope of the claims hereinafter made.

I claim:

1. In a sequence control apparatus for gas-making apparatus valves and their operating mechanisms that require to be actuated respectively in predetermined sequence, in combination: a fluid-pressure medium supply connection; fluid pressure lines respectively leading to the respective valve-operating mechanisms; and a control device that is directly inserted in the flow-path from said supply connection to said lines respectively and that itself admits and intercepts the flow of said pressure medium through it to said lines in predetermined sequence and is movable as a unit in relation to said lines and, by its movement in relation to said lines, itself determines the sequence in which the valves are operated by fluid pressure in said lines.

2. In a sequence control apparatus for gas-making apparatus valves and their operating mechanisms that require to be actuated respectively in predetermined sequence, in combination: a fluid-pressure medium supply connection; fluid pressure lines respectively leading to the respective valve-operating mechanisms; a control device that is directly inserted in the flow-path from said supply connection to said lines respectively and that itself admits and intercepts the flow of said pressure medium through it to said lines in predetermined sequence and is movable as a unit in relation to said lines and, by its movement in relation to said lines, itself determines the sequence in which the valves are operated by fluid pressure in said lines; and means for effecting said movement of the control device by fluid pressure.

3. In a sequence control apparatus for gas-making apparatus valves and their operating mechanisms that require to be actuated respectively in predetermined sequence, in combination: a fluid-pressure medium supply connection; fluid pressure lines respectively leading to the respective valve-operating mechanisms; a control device that is directly inserted in the flow-path from said supply connection to said lines respectively and that itself admits and intercepts the flow of said pressure medium through it to said lines in predetermined sequence and is movable as a unit in relation to said lines and, by its movement in relation to said lines, itself determines the sequence in which the valves are operated by fluid pressure in said lines; means for effecting said movement of the control device by fluid pressure; and adjustable means for varying the time periods of the individual valve movements.

4. In a control device for gas-making apparatus valves, in combination: a power-transmission device adapted to be connected with a series of power lines respectively leading to and operating a plurality of such valves; and a unitary control member adapted to traverse said transmission device and successively and directly admit and intercept the flow of power through said transmission device directly to said power lines; whereby the sequence of operation of said power lines is positively and directly determined by said unitary control member.

5. In a control device for gas-making apparatus valves, in combination: a power-transmission device adapted to be connected with a series of power lines respectively leading to and operating a plurality of such valves; a unitary control member adapted to traverse said transmission device and successively and directly admit and intercept the flow of power through said transmission device directly to said power lines; and an adjustable timing device adapted to determine automatically the time periods of the operation of the power lines by said unitary control member; whereby automatically-timed sequence of operation of said power lines is positively and directly determined by said unitary control member in cooperation with said timing device.

6. In a mechanism for effecting the operation of a plurality of sequence operated apparatus valves of a water gas set, in combination: a separate fluid-pressure actuated means for operating each of said apparatus valves, a single control valve having a plurality of different operative positions, and communicating therewith a corresponding series of connections respectively for supplying motive fluid to and exhausting it from the respective different fluid-pressure actuated means to open and close said apparatus valves respectively in predetermined sequence as said control valve is adjusted back and forth through its different operative positions.

7. In a mechanism for effecting the operation of a plurality of sequence operated apparatus valves of a water gas set, in combination: a separate fluid-pressure actuated means for operating each of said apparatus valves, a single control valve having a plurality of different operative positions, and communicating therewith a corresponding series of connections respectively for supplying motive fluid to and exhausting it from the respective different fluid-pressure actuated means to open and close said apparatus valves respectively in predetermined sequence as said control valve is adjusted back and forth through its different operative positions, and means for varying the individual time periods of the valve operations.

8. In a sequence control apparatus for gas-making apparatus valves and their operating mechanisms that require to be actuated respectively in predetermined sequence, in combination: a fluid-pressure medium supply connection; fluid pressure lines respectively leading to the respective valve-operating mechanisms; a control device that is directly inserted in the flow-path from said supply connection to said lines respectively and that itself admits and intercepts the flow of said pressure medium through it to said lines in predetermined sequence and is movable as a unit in relation to said lines and, by its movement in relation to said lines, itself determines the sequence in which the valves are operated by fluid pressure in said lines; valve controlled means for effecting fluid pressure operation of the control device; and liquid exhaust chambers having a series of orifices through which exhaust liquid flows in succession for controlling the rate of movement of said control device.

9. In a sequence control apparatus for gas-making apparatus valves and their operating mechanisms that require to be actuated respectively in predetermined sequence, in combination: a fluid-pressure medium supply connection; fluid pressure lines respectively leading to the respective valve-operating mechanisms; a control device that is directly inserted in the flow-path from said supply connection to said lines respectively and that itself admits and intercepts the flow of said pressure medium through it to said lines in predetermined sequence and is movable as a unit in relation to said lines and, by its movement in relation to said lines, itself determines the sequence in which the valves are operated by fluid pressure in said lines; means for effecting fluid pressure operation of the control device; a liquid exhaust chamber having a series of orifices through which exhaust liquid flows in succession for controlling the rate of movement of said control device; and manually operated needle valves for controlling the flow through said orifices.

10. In a sequence control apparatus for gas-making apparatus valves and their operating mechanisms that require to be actuated respectively in predetermined sequence, in combination; a fluid-pressure medium supply connection; fluid pressure lines respectively leading to the respective valve-operating mechanisms; a control device that is directly inserted in the flow-path from said supply connection to said lines respectively and that itself admits and intercepts the flow of said pressure medium through it to said lines in predetermined sequence and is movable as a unit in relation to said lines and, by its movement in relation to said lines, itself determines the sequence in which the valves are operated by fluid pressure in said lines; means for effecting fluid pressure operation of the control device; liquid exhaust chamber having a series of orifices through which exhaust liquid flows in succession for controlling the rate of movement of said control device; an auxiliary cylinder having a device therein to automatically regulate the direction of flow of fluid pressure to and from said means for effecting fluid pressure operation of the control device.

11. In a sequence control apparatus for gas-making apparatus valves and their operating mechanisms that require to be actuated respectively in predetermined sequence, in combination: a fluid-pressure medium supply connection; fluid pressure lines respectively leading to the respective valve-operating mechanisms; a control device that is directly inserted in the flow-path from said supply connection to said lines respectively and that itself admits and intercepts the flow of said pressure medium through it to said lines in predetermined sequence and is movable as a unit in relation to said lines and, by its movement in relation to said lines, itself determines the sequence in which the valves are operated by fluid pressure in said lines; means for effecting fluid pressure operation of the control device; liquid exhaust chamber having a series of orifices through which exhaust liquid flows in succession for controlling the rate of movement of said control device; an auxiliary cylinder having a piston therein to automatically regulate the direction of flow of fluid pressure to and from said means for effecting fluid pressure operation of the control device; and fluid pressure lines leading from said supply connection to said auxiliary cylinder and controlled by said control device for supply of fluid pressure to the piston within said auxiliary cylinder whereby said control device automatically operates the piston in said auxiliary cylinder to automatically regulate the direction of flow of fluid pressure to operate the control device.

12. In a sequence control apparatus for gas-making apparatus valves and their operating mechanisms that require to be actuated respectively in predetermined sequence, in combination: a fluid-pressure medium supply connection; fluid pressure lines respectively leading to the respective valve-operating mechanisms; a control device that is directly inserted in the flow-path from said supply connection to said lines respectively and that itself admits and intercepts the flow of said pressure medium through it to said lines in predetermined sequence and is movable as a unit in relation to said lines and, by its movement in relation to said lines, itself determines the sequence in which the valves are operated by fluid pressure in said lines; means for effecting fluid pressure operation of the control device; and an auxiliary cylinder having a piston therein to automatically regulate the direction of flow of fluid pressure to and from said means for effecting fluid pressure operation of said control device.

13. In a sequence control apparatus for gas-making apparatus valves and their operating mechanisms that require to be actuated respectively in predetermined sequence, in combination: a fluid-pressure medium supply connection; fluid pressure lines respectively leading to the respective valve-operating mechanisms; a control device that is directly inserted in the flow-path from said supply connection to said lines respectively and that itself admits and intercepts the flow of said pressure medium through it to said lines in predetermined sequence and is movable as a unit in relation to said lines and, by its movement in relation to said lines, itself determines the sequence in which the valves are operated by fluid pressure in said lines; means for effecting fluid pressure operation of the control device, an auxiliary cylinder having a piston therein to automatically regulate the direction of flow of fluid pressure to and from said means for effecting fluid pressure operation of said control device; fluid pressure lines leading to said auxiliary cylinder for fluid operation of the piston therein, said fluid pressure lines being controlled by said control device, whereby said control device automatically controls said auxiliary cylinder piston.

14. In a carburetted water-gas set embodying, with its generator and carburetter and superheater, an up-and-down run valve mechanism and steam connections, an oil valve mechanism, a stack valve mechanism, a generator blast valve mechanism, and a carburetter blast valve mechanism, in combination: a source of fluid pressure for supplying motive power to operate the respective valve mechanisms; fluid pressure lines leading to the respective valve-operating mechanisms; a fluid-pressure operated control device that is directly inserted in the flow-path to said lines and that has a plurality of different operative positions for releasing fluid pressure intermittently from said source to said fluid pressure lines leading to said valve mechanisms in the above named sequence as said device is adjusted back and forth through its different positions; means for varying individually the rate of movement of said control device between each valve operation and the succeeding valve operation, to vary individually the time intervals between valve operations; and means, operable after a sequence of such valve operations for effecting reverse operation of the aforesaid control device to effect operation of said valve mechanisms in reverse sequence; substantially as specified.

15. In a carburetted water-gas set embodying, with its generator and carburetter and superheater, an up-and-down run valve mechanism and steam connections, an oil valve mechanism, a stack valve mechanism, a generator blast valve mechanism, and a carburetter blast valve mechanism, in combination: a source of fluid pressure for supplying motive power to operate the respective valve mechanisms; fluid pressure lines leading to the respective valve-operating mechanism; a fluid pressure operated single control device that is directly inserted in the flow-path to said lines and that has a plurality of different operative positions for releasing fluid pressure intermittently from said source to said valve mechanisms in the above named sequence as said device is adjusted back and forth through its different positions; and means operable after a sequence of such valve operations for effecting reverse operation of the aforesaid control device to effect operation of such valve mechanisms in reverse sequence; substantially as specified.

16. In a carburetted water-gas set, comprising a generator and carburetter and superheater, in combination: an up-and-down run valve mechanism and steam connections; an oil valve mechanism; a stack valve mechanism; a generator blast valve mechanism; a carburetter blast valve mechanism; fluid pressure lines leading to the respective valve-operating mechanisms; and a fluid pressure operated element that is directly inserted in the flow-path to said lines and that itself intercepts all said fluid pressure lines and that is movable relative to all of them for determining the sequence in which said fluid pressure lines receive fluid and that is reversely operable for effecting the operation of said valve mechanisms in the above named sequence and in the reverse sequence; substantially as specified.

17. In a gas making apparatus having a plurality of valves that require to be actuated respectively in predetermined sequence, in combination: a plurality of independent valve mechanisms operable in a predetermined order; a source of fluid pressure for supplying motive power to operate the respective valve mechanisms; fluid pressure lines leading to the respective valve-operating mechanisms; a fluid pressure operated control device that is directly inserted in the flow-path to said lines and that has a plurality of different operative positions for releasing fluid pressure intermittently from said source to said valve mechanisms in their predetermined order as said control device is adjusted through the flow paths to said lines; and means operable after the sequence of such valve operations for effecting reverse operation of the aforesaid control device to effect operation of said valve mechanisms in reverse order; substantially as specified.

18. In a gas making apparatus having a plurality of valves that require to be actuated respectively in predetermined sequence, in combination: a plurality of independent valve mechanisms operable in a predetermined order; a source of fluid pressure for supplying motive power to operate the respective valve mechanisms; fluid pressure lines leading to the respective valve-operating mechanisms; a fluid pressure operated control device that is directly inserted in the flow-path to said lines and that has a plurality of different operative positions for releasing fluid pressure intermittently from said source to said valve mechanisms in their predetermined order as said control device is adjusted through the flow paths to said lines; means for varying individually the rate of movement of said control device between each said valve operation and the succeeding valve operation, to vary individually the time intervals between valve operations; and means, operable after a sequence of such valve operations, for effecting reverse operation of the aforesaid control device, to effect reverse operation of said valve mechanisms; substantially as specified.

19. In a gas making apparatus having a plurality of valves that require to be actuated respectively in predetermined sequence, in combination: a plurality of independent valve mechanisms operable in a predetermined order; fluid pressure lines leading to the respective valve-operating mechanisms; a fluid pressure operated element that is directly inserted in the flow-path to said lines and that has a plurality of different operative positions for effecting the operation of said valves in said predetermined order as said element is adjusted through the flow-paths to said lines; means for varying the rate of movement of said control element between each valve operation and the succeeding valve operation, to vary individually the time intervals between valve operations; and means operable after a sequence of such valve operations, for effecting reverse operation of the aforesaid control element, to effect reverse operation of such valve mechanisms; substantially as specified.

20. In a gas making apparatus having a plurality of valves that require to be actuated respectively in predetermined sequence, in combination: a plurality of individual valve mechanisms operable in a predetermined order; fluid pressure supply line connections for effecting the operation of said valve mechanisms; and a pressure operated piston itself controlling the flow of fluid pressure to and from all said supply line connections and that is movable as a unit in relation to said line connections and, by its movement in relation to said line connections, itself determines the sequence in which the valves are operated by fluid pressure in said line connections; substantially as specified.

21. An automatically controlled water gas set comprising a combination of water gas generator and carburetter and superheater and their apparatus valves and the respective operating mechanisms of said valves, a series of fluid pressure lines respectively leading to said valve-operating mechanisms, a fluid-pressure medium supply connection, a controlling device that is directly inserted in the flow-path from said supply connection to said lines respectively and that itself admits and intercepts the flow of said pressure medium through it to said lines in predetermined sequence and is movable as a unit in relation to said lines and, by its movement in relation to said lines, itself determines the sequence in which the said apparatus valves are operated by fluid pressure in said lines, and means for varying individually the rate of movement of said control device between each said valve operation and the succeeding valve operation and so varying individually the time intervals between the valve operations whose sequence is determined by the control device.

THOMAS W. STONE.